United States Patent [19]

Covezzi et al.

[11] Patent Number: 5,296,548
[45] Date of Patent: Mar. 22, 1994

[54] COMPOSITIONS OF CRYSTALLINE PROPYLENE POLYMERS HAVING A LOW SEAL TEMPERATURE

[75] Inventors: Massimo Covezzi; Antonio Ciarrocchi, both of Ferrara, Italy

[73] Assignee: Himont Incorporated, Wilmington, Del.

[21] Appl. No.: 763,695

[22] Filed: Sep. 23, 1991

[30] Foreign Application Priority Data

Sep. 28, 1990 [IT] Italy ................. 21601 A/90

[51] Int. Cl.$^5$ ............... C08F 297/08; C08L 23/16; C08L 23/14
[52] U.S. Cl. .................. 525/322; 525/240; 525/323
[58] Field of Search ............ 525/240, 322, 323

[56] References Cited

U.S. PATENT DOCUMENTS

| 4,481,336 | 11/1984 | Fujii et al. ............... 525/323 |
| 4,502,263 | 3/1985 | Crass et al. ............... 428/516 |
| 4,652,489 | 3/1987 | Crass et al. ............... 525/240 |
| 4,725,505 | 2/1988 | Hwo et al. ............... 428/516 |
| 4,766,178 | 8/1988 | Hwo ............... 525/240 |
| 4,769,421 | 9/1988 | Hwo ............... 525/240 |
| 4,822,840 | 4/1989 | Kioka et al. ............... 525/240 |
| 4,871,813 | 10/1989 | Senez ............... 525/240 |

FOREIGN PATENT DOCUMENTS

| 0324250 | 7/1989 | European Pat. Off. . |
| 58059247 | 4/1983 | Japan ............... 525/240 |

Primary Examiner—Carman J. Seccuro, Jr.

[57] ABSTRACT

Discosed are compositions of crystalline propylene polymers comprising (by weight):

A) 30-65% of a copolymer of propylene with a $C_4$-$C_8$ α-olefin, containing from 98 to 80% propylene;

B) 35-70% of a copolymer of propylene with ethylene and optionally from 2 to 10% of a $C_4$-$C_8$ α-olefin, said copolymer containing 2 to 10% ethylene when the $C_4$-$C_8$ α-olefin is not present, and 0.5 to 5% ethylene when the $C_4$-$C_8$ α-olefin is present.

7 Claims, No Drawings

COMPOSITIONS OF CRYSTALLINE PROPYLENE POLYMERS HAVING A LOW SEAL TEMPERATURE

The present invention relates to compositions of crystalline propylene polymers suitable for the preparation of heat-sealable film and to the process for preparing said compositions.

The use of crystalline copolymers of propylene with olefins (mainly ethylene and/or 1-butene), or mixtures of same with other olefin polymers, as materials having sealing properties, is known in the art.

Said crystalline copolymers are obtained by polymerizing propylene with small quantities of olefin comonomers in the presence of coordination catalysts.

The comonomers are statistically distributed in the resulting polymer and the melting point of said polymer is lower than the melting point of crystalline homopolymers of propylene.

However, the introduction of comonomers leads to a partial degradation of the crystalline structure, together with the formation of relatively large quantities of a polymer fraction which is soluble in cold xylene (at 25° C.).

Therefore, the mechanical properties of the polymer deteriorate and, even when said polymer is used for the preparation of multilayered film, for example, for example by coextrusion with polypropylene, some incompatibility problems with the polypropylene layer can arise so that a satisfactory durability of the seal is not obtained.

Moreover, the presence of high amounts of xylene-solubles causes the polymer to be easily attacked by organic substances, making it unsuitable for packaging food products.

The disadvantages mentioned above cannot be easily overcome by using mixtures of said crystalline copolymers of propylene with other polymers, because the sealing properties seem to be related to the nature and relative quantities of the crystalline fractions, and the xylene-soluble fraction and, probably, to their distribution within the polymer material.

Moreover, the preparation of the mixtures requires treatments which are expensive both in terms of time and energy (granulation, for example) in order to obtain a homogeneous dispersion of the components.

Therefore, there has been a real need for obtaining propylene polymers which can be used directly in the preparation of sealable films having a low seal initiation temperature and low content of solubles (i.e. high crystallinity levels).

New propylene polymer compositions have been obtained which meet the above mentioned needs by way of a particular polymerization process.

Particularly, the compositions of crystalline polymers of propylene of this invention comprise (weight percentage):

A) 30–65%, preferably 35–65%, more preferably 45–65%, of a copolymer of propylene with a $C_4$–$C_8$ α-olefin containing from 98 to 80%, preferably from 95 to 85%, of propylene;

B) 35–70%, preferably 35–65%, more preferably 35–55%, of a copolymer of propylene with ethylene, and optionally from 2 to 10%, preferably from 3 to 6%, of a $C_4$–$C_8$ α-olefin, said copolymer containing 2 to 10% ethylene, preferably from 7 to 9% when the $C_4$–$C_8$ α-olefin is not present, and 0.5 to 5%, preferably from 1 to 3% ethylene, when the $C_4$–$C_8$ α-olefin is present.

The $C_4$–$C_8$ α-olefin is preferably selected from 1-butene; 1-pentene; 1-hexene; 4-methyl-1-pentene; and 1-octene. Particularly preferred is 1-butene.

Preferred compositions are those is which the $C_4$–$C_8$ α-olefin is not present in copolymer (B).

Moreover, the above compositions present the following properties:

melting point about 125° to 140° C.; seal initiation temperature (defined below) 100° to 110° C.; fraction soluble in xylene at 25° C. less than 20%, preferably less than 15%, more preferably less than 10% by weight; fraction soluble in n-hexane at 50° C. less than 5.5% by weight.

"Seal initiation temperature", or S.I.T., is the minimum seal temperature at which the seal of a multilayered film having at least one layer of polypropylene and one layer of the composition of this invention does not break when a 200 g load is applied to the film. The particulars will be given in the Examples.

The compositions of the invention are prepared by sequential polymerization of monomers in the presence of stereospecific Ziegler-Natta catalysts supported on activated magnesium dihalides in active form. Said catalysts contain, as an essential element, a solid catalyst component comprising a titanium compound having at least one titanium-halogen bond and an electron-donor compound, both supported on a magnesium halide in active form.

The catalysts used in the process of the invention are characterized in that they are capable of producing polypropylene having an isotactic index higher than 90%, preferably higher than 95%. Catalysts having the above characteristics are well known in patent literature.

Particularly useful have been the catalysts described in U.S. Pat. No. 4,339,054 and European Patent No. 45,977. Other examples of catalysts are described in U.S. Pat. Nos. 4,472,524 and 4,473,660.

Solid catalyst components used in the preparation of these catalysts contain, as electron-donor compounds, those compounds selected from ethers, ketones, lactones, compounds containing N, P, and/or S atoms, and esters of mono- and dicarboxylic acids.

Particularly suited are phthalic acid esters, such as diisobutyl, dioctyl and diphenylphthalate, and benzyl butyl phthalate; malonic acid esters, such as diisobutyl and diethyl malonate; alkyl and aryl pivalates; alkyl, cycloalkyl and aryl maleates, alkyl and aryl carbonates, such as diisobutyl carbonate, ethylphenyl carbonate and diphenyl carbonate; succinic acid esters, such as mono and diethyl succinate.

Other electron-donors particularly suited are the 1,3-diethers of formula

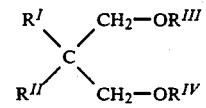

where $R^I$ and $R^{II}$ are the same or different, and are $C_{1-18}$ alkyl, $C_{3-18}$ cycloalkyl or $C_{6-18}$ aryl radicals; and $R^{III}$ and $R^{IV}$, are the same or different, and are alkyl radicals having 1–4 carbon atoms.

Ethers of this type are described in published European patent application No. 361,493.

Examples representative of said compounds are 2-methyl-2-isopropyl-1,3-dimethoxypropane, 2,2-diisobutyl-1,3-dimethoxypropane and 2-isopropyl-2-cyclopetnyl-1,3-dimethoxypropane.

The catalyst components mentioned above are prepared according to various methods.

For example, the magnesium halide (used in an anhydrous state containing less than 1% water), the titanium compound and the electron-donor compound can be ground or milled together under conditions in which the magnesium halide is activated; the ground product is then treated one or more times with excess $TiCl_4$, at a temperature between 80° and 135° C., and washed repeatedly with a hydrocarbon (such as hexane, for example) until no chlorine ions are found in the washing liquid.

According to another method the anhydrous magnesium halide is preactivated by known methods, and then caused to react with excess $TiCl_4$ containing the electron-donor compound in solution. The temperature during this operation is also between 80° and 135° C. Optionally, the treatment with $TiCl_4$ is repeated, and the solid is then washed with hexane or another hydrocarbon solvent to eliminate all traces of unreacted $TiCl_4$.

Following yet another method, a $MgCl_2.nROH$ adduct (particularly in the form of spheroidal particles), where n is generally a number from 1 to 3 and ROH is ethanol, butanol or isobutanol, is caused to react with excess $TiCl_4$ containing the electron-donor compound in solution. The temperature is generally between 80° and 120° C. The solid is then isolated and caused to react once more with $TiCl_4$, then separated and washed with a hydrocarbon until no chlorine ions are found in the washing liquid.

According to another method, magnesium alcoholates and chloroalcoholates (the chloroalcoholates prepared particularly according to the method described in U.S. Pat. No. 4,220,554) are caused to react with excess $TiCl_4$ containing the electron-donor compound in solution, operating under the reaction conditions described above.

In the solid catalyst component, the titanium compound expressed as Ti generally is present in a percentage by weight of 0.5 to 10%; the quantity of electron-donor compound which remains fixed on the solid (internal donor) generally is of 5 to 20 mole % with respect to the magnesium dihalide.

The titanium compounds which can be used for the preparation of the catalyst components are halides and halogen alcoholates. Titanium tetrachloride is the preferred compound.

Satisfactory results can be obtained also with titanium trihalides, particularly $TiCl_3$ HR, $TiCl_3$ ARA, and with halogen alcoholates, such as $TiCl_3OR$, where R is a phenyl radical.

The reactions indicated above lead to the formation of magnesium halide in active form. In the art, other reactions are known, besides the ones just mentioned, which lead to the formation of magnesium halide in active form starting from magnesium compounds different from the halides, such as, for example, magnesium carboxylates.

The presence of the active form of the magnesium halide in the solid catalyst components is evidenced by the fact that in the X-ray spectrum of the catalyst component, the maximum intensity reflection which appears in the spectrum of the unactivated magnesium halide (with a surface area of less than 3 $m^2/g$) is no longer present, but in its place there is a halo with the maximum intensity shifted with respect to the position of the maximum intensity reflection of the unactivated magnesium halide, or by the fact that the maximum intensity reflection presents a half-peak breadth at least 30% greater than the maximum intensity reflection which appears in the spectrum of the unactivated Mg halide. The most active forms are those where the X-ray spectrum shows a halo.

Chloride is the preferred compound among the magnesium halides. In the case of most active forms of Mg chloride, the X-ray spectrum of the catalyst component shows a halo in place of the reflection which appears at a distance of 2.56 Å in the spectrum of the unactivated chloride.

Al-alkyl compounds which can be used as co-catalysts include the Al-trialkyls, such as Al-triethyl, Al-triisobutyl, Al-tri-n-butyl, and linear or cyclic Al-alkyl compounds containing two or more Al atoms bound between them by O or N atoms, or by $SO_4$ and $SO_3$ groups. Examples of said compounds are:

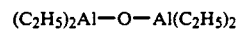

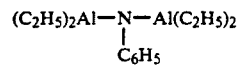

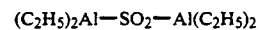

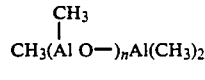

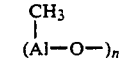

where n is a number from 1 to 20.

One can also use $AlR_2OR'$ compounds, where R' is an aryl radical substituted in one or more positions and R is an alkyl radical having 1–6 carbon atoms, and $AlR_2H$ compounds, where R has the above indicated meaning.

The Al-alkyl compound generally is used in such quantities as to cause the Al/Ti ratio to be from 1 to 1000.

The electron-donor compounds that can be used as external donors (added to the Al alkyl compound) include aromatic acid esters, such as alkyl benzoates, and in particular silicon compounds containing at least one Si-OR bond (R=hydrocarbon radical), 2,2,6,6-tetramethylpiperidine, and 2,6-diisopropylpiperidine.

Examples of silicon compounds are (tert-butyl)$_2$-Si(OCH$_3$)$_2$, (cyclohexyl)$_2$Si(OCH$_3$)$_3$ and (phenyl)-$_2$Si(OCH$_3$)$_2$. 1,3-Diethers having the formula described above can also be used advantageously. If the internal donor is one of these diethers, the external donors can be omitted.

Polymerization is carried out in at least two stages, preparing fractions (A) and (B) in separate and successive stages, operating in each stage in the presence of the polymer and the catalyst used in the preceding stage. For example, fraction (B) can be prepared in one stage, and fraction (A) in a subsequent stage. The order in which fractions (A) and (B) are prepared is not critical, but the preparation of (A) before (B) is preferred.

The polymerization process can be continuous or discontinuous, following known techniques and operating in liquid phase, in the presence or absence of an inert diluent, or in gas phase, or in mixed liquid-gas techniques. It is preferable to operate in gas phase.

Reaction times and temperatures relative to the two stages are not critical; however, it is best if the temperature is from 20° to 100° C. The regulation of the molecular weight is effected by using known regulators, such as, particularly, hydrogen.

The catalysts can be precontacted with small quantities of olefins (prepolymerization). Prepolymerization improves both the performance of the catalysts and the morphology of the polymers.

Prepolymerization is achieved by maintaining the catalyst in suspension in a hydrocarbon solvent (hexane, heptane, etc), and polymerizing at a temperature from ambient to 60° C. for a time sufficient to produce quantities of polymer from 0.5 to 3 times the weight of the solid catalyst component. It can also be done in liquid propylene, at the temperature conditions indicated above, producing quantities of polymer which can reach up to 1000 g per g of catalyst component.

Since fractions (A) and (B) are prepared directly in polymerization, the compositions of the present invention are in the form of nonextruded particles. Fractions (A) and (B) in said particles are mixed in an optimal way, so that the compositions of the present invention can be used directly for the production of heat-sealable film without resorting to pretreatments such as pelletizing.

The preferred compositions are in the form of as-polymerized spherical or spheroidal particles having a diameter from 0.5 to 4.5 mm, and more preferably having a narrow particle-size distribution, that is to say that at least 90% have a diameter from 0.5 to 3.5 mm. Particles of this type can be obtained for example by using the catalysts described in U.S. Pat. No. 4,472,524.

The following examples illustrate, but do not limit, the methods of preparation and the characterization of the above mentioned compositions.

Preparation of the solid catalyst component

Under inert gas and at ambient temperature, 48 g of anhydrous magnesium chloride, 77 g anydrous ethyl alcohol and 830 ml of kerosene are charged into a 2 liter autoclave equipped with turbine agitator and dip pipe.

The contents of the autoclave are heated to 120° C., under agitation, and the adduct between $MgCl_2$ and alcohol is formed, which melts and remains mixed to the dispersing agent. The nitrogen pressure inside the autoclave is maintained at 15 atm. The dip pipe of the autoclave is heated externally at 120° C. with a heating jacket, has an inside diameter of 1 mm and measures 3 meters from one end of the heating jacket to the other.

The mixture is then caused to flow along the pipe at a rate of about 7 m/sec. At the exit of the pipe the dispersion is collected under agitation in a 5 liter flask, said flask containing 2.5 l of kerosene and being cooled externally with a jacket maintained at the initial temperature of $-40°$ C. The final temperature of the emulsion is 0° C. The spherical solid which constituted the disperded phase of the emulsion is separated by settling and filtration, washed with heptane and dried.

All of these operations are carried out in an inert gas atmoshere.

130 g of $MgCl_{12}.3C_2H_5OH$ in the form of solid spherical particles having a maximum diameter of less than 50 $\mu$m are obtained. The solid product, dried under vacuum for two hours, weights 105 g.

The solid product is heated in nitrogen flow to a temperature of about 60° C. in order to partially remove the alcohol from the adduct, thus producing a $MgCl_2.2.1C_2H_5OH$ adduct.

Using the adduct prepared in this manner, the solid catalyst component is prepared as follows.

Into a 1 liter glass flask equipped with a condenser, mechanical agitator and thermometer, are introduced, under an anhydrous nitrogen atmosphere, with agitation and at 0° C., 625 ml of $TiCl_4$, then 25 g of the $MgCl_2.2.1C_2H_5OH$ adduct are added.

The contents of the flask are heated to 100° C. in 1 hour. 9 mmoles of diisobutylphthalate are introduced when the temperature reaches 40° C. Said temperature is maintained at 100° C. for 2 hours, after which it is allowed to settle and the liquid is then syphoned off. 550 ml of $TiCl_4$ are added, the temperature is brought to 120° C. for 1 hour. At the end the solid content of the flask is allowed to settle and the liquid is syphoned off; the solid residue is then washed 6 times with 200 cc of anhydrous hexane at 60° C. and 3 times at ambient temperature.

EXAMPLES 1 and 2

Two polymerizations are carried out using the catalyst component prepared as described above.

General operating conditions

The polymerization is carried out in continuous manner in a series of reactors equipped with devices to transfer the product from one reactor to the next reactor under an inert atmosphere.

In the gas phase, hydrogen and monomers are continuously analysed and fed in order to maintain the desired concentrations constant.

In the following examples a mixture of a triethylaluminum (TEAL) activator and a dicyclohexyldimethoxysilane electron-donor, in quantities such that the TEAL/silane weight ratio is about 6.4, is contacted with the solid catalyst component, in a reactor at $-5°$ C. for about 15 minutes, in a manner such that the TEAL/Ti molar ratio is 65.

The catalyst is then transferred to another reactor containing an excess of liquid propylene, and polymerized for 3 minutes at 20° C.

In the first phase, the prepolymer is transferred to another reactor in order to polymerize the monomers in gas phase, so as to form fraction (B) in Example 1 and fraction (A) in Example 2.

In the second phase, the product of the reactor immediately preceding is fed, after having removed any unreacted monomers, to the second reactor in gas phase in order to polymerize the monomers, so as to form the other one of the two fractions.

At the end of the second polymerization phase, the polymer is discharged in a washing apparatus where any unreacted monomers and volatile substances are removed by means of steam treatment at 105° C. at atmospheric pessure, for about 10 minutes, and then dried by conventional methods.

Starting materials and operating conditions are shown in Table 1A; the results of polymerization tests relative to fractions (A) and (B) as well as the final compositions are shown in Table 1B.

The following analytical methods have been used in order to obtain the information in Table 1B.

Ethylene content ($C_2$)

Determined by IR spectroscopy.

1-butene content ($C_4$)

Determined by IR spectroscopy.

Melting point

Determined by DSC.

Fraction soluble in xylene

Determined by solubilizing a sample of the material in xylene at 125° C. and cooling the solution to ambient temperature. The soluble and insoluble fractions are separated by filtration.

Fraction soluble in hexane

Determined by subjecting a 100 μm thick film of the product to extraction with hexane in an autoclave at 50° C. for 2 hours. The hexane is then evaporated and the dry residue determined.

Melt Index

Determined according to ASTM D 1238, condition L.

Intrinsic viscosity

Determined in tetrahydronaphthalene at 135° C.

TABLE 1A

|  | Examples | |
|---|---|---|
|  | 1 | 2 |
| FIRST REACTOR IN GAS PHASE | | |
| Temperature, °C. | 65 | 65 |
| Pressure, atm | 17 | 17 |
| Residence time, min | 75 | 75 |
| $H_2/C_3$ (mol.) | 0.003 | 0.035 |
| $H_2/C_2$ (mol.) | 0.151 | — |
| $C_2/C_2 + C_3$ (mol.) | 0.023 | — |
| $C_4/C_4 + C_3$ (mol.) | 0.044 | 0.178 |
| SECOND REACTOR IN GAS PHASE | | |
| Temperature, °C. | 70 | 70 |
| Pressure, atm | 17 | 20 |
| Residence time, min | 45 | 45 |
| $H_2/C_3$ (mol.) | 0.005 | 0.026 |
| $H_2/C_2$ (mol.) | — | 0.605 |
| $C_2/C_2 + C_3$ (mol.) | — | 0.041 |
| $C_4/C_4 + C_3$ (mol.) | 0.214 | — |

TABLE 1B

|  | Examples | |
|---|---|---|
|  | 1 | 2 |
| Fraction (A), weight % | 52 | 45.1 |
| Fraction (B), weight % | 48 | 54.9 |
| $C_2$ in (B), weight % | 2.5 | 3.8 |
| $C_4$ in (A), weight % | 14.2 | 15.3 |
| $C_4$ in (B), weight % | 3.6 | — |
| Melting point*, °C. |  | 132.8 |
| MIL* g/10 min | 1.65 | 6.07 |
| Intrinsic viscosity*, dl/g | 2.31 | 1.69 |
| Xylene solubles at 25° C., weight % | 15.72 | 11.72 |
| Intrinsic viscosity of xylene solubles dl/g | 1.78 | 1.02 |
| Soluble in hexane at 50° C., weight % | 3 | 5 |
| Yield, g polymer/g cat. comp. | 6,500 | 20,000 |

*refers to final composition

The seal initiation temperature (SIT) of the compositions of Examples 1 and 2 has been determined by the following methods.

FILM PREPARATION

Various films with a thickness of 50 μm have are by extruding the compositions of Examples 1 and 2 at about 200° C.

Each film thus obtained is superimposed on a polypropylene film prepared from a polypropylene having an isotactic index of 97 (in boiling n-heptane) and Melt Index of 4.5 g/10 minutes. The thickness of the polypropylene film was 560 μm.

The layered films are bonded in a plate press at 200° C. with a load of 9000 kg maintained for 5 minutes.

The bonded films ar stretched to 6 times their length in both directions, using a film stretcher produced by TM LONG, thereby forming 20 μm thick films.

5×10 cm samples are obtained from the above mentioned films.

Determining the S.I.T.

The testing was done by applying a load of 200 g to heat-sealed samples.

For each test two of the above samples are superimposed, with the heat-sealable layers (made up by the compositions of Examples 1 and 2) face-to-face. Said superimposed samples are sealed along the 5 cm side with a Sentinel combination laboratory sealer model 12—12 AS.

Sealing time is 5 seconds, pressure 1.2 atm., and seal width 2.5 cm. The sealing temperature is increased 2° C. for each sample to be tested.

The sealed samples are then cut to obtain 2.5×10 cm pieces and the unsealed ends attached to a dynamometer.

As mentioned above, the minimum sealing temperature where the seal does not break when a 200 g load is applied represents the Seal Initiation Temperature (S.I.T.).

The S.I.T. values for the compositions of samples 1 and 2 were 100 and 105° C., respectively.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A composition of crystalline propylene polymers consisting essentially of (percent by weight) either (I):

A) 30–65% of a copolymer consisting of propylene and a $C_4$–$C_8$ α-olefin containing from 98 to 80% propylene; and B) 35–70% of a copolymer consisting of propylene with ethylene, said copolymer containing 2 to 10% ethylene; or (II):

A) 45–65% of copolymer (I) A); and

B) 55–35% of a terpolymer consisting of propylene with ehtylene and from 2 to 10% of a $C_4$–$C_8$ α-olefin, said terpolymer containing 0.5 to 5% ethylene, wherein the composition has a melting point of about 125° to 140° C. and is prepared by sequential polymerization.

2. The composition of claim 1 in the form of nonextruded spheroidal particles having a diameter of 0.5 to 4.5 mm.

3. The composition of claim 1, wherein the $C_4$–$C_8$ α-olefin is selected from the group consisting of 1-butene, 1-hexene, 4-methyl-1-pentene, and 1-octene.

4. The composition of claim 1, wherein the content of the fraction which is soluble in xylene at 25° C. is of less than 20% by weight.

5. The composition of claim 1, wherein the content of the fraction which is soluble in n-hexane at 50° C. is of less than 5.5% by weight.

6. A process for the preparation of the composition of claim 1, comprising polymerizing the relevant monomers in the presence of stereospecific catalysts supported on magnesium dihalides in active form, in at least two stages, thus preparing fractions (A) and (B) in separate and successive stages, with each subsequent stage being conducted in the presence of the polymer formed and the catalyst used in the immediately preceding stage.

7. The process of claim 6, wherein all stages of the polymerization are carried out in gas phase.

* * * * *